US010763675B2

(12) United States Patent
Maedako et al.

(10) Patent No.: US 10,763,675 B2
(45) Date of Patent: Sep. 1, 2020

(54) POWER GENERATOR SYSTEM

(71) Applicant: Honda Motor Co., Ltd., Tokyo (JP)

(72) Inventors: Minoru Maedako, Wako (JP); Tetsuya Matsuhisa, Wako (JP); Kenji Shibata, Wako (JP); Wataru Matsuyama, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 215 days.

(21) Appl. No.: 15/936,382

(22) Filed: Mar. 26, 2018

(65) Prior Publication Data

US 2018/0287392 A1    Oct. 4, 2018

(30) Foreign Application Priority Data

Mar. 30, 2017    (JP) .................................. 2017-066549

(51) Int. Cl.
| | |
|---|---|
| *H02P 6/14* | (2016.01) |
| *H02J 3/46* | (2006.01) |
| *H02J 3/40* | (2006.01) |
| *H02P 25/22* | (2006.01) |
| *H02P 9/02* | (2006.01) |
| *H02P 5/74* | (2006.01) |

(52) U.S. Cl.
CPC ................ *H02J 3/46* (2013.01); *H02J 3/40* (2013.01); *H02P 5/74* (2013.01); *H02P 9/02* (2013.01); *H02P 25/22* (2013.01)

(58) Field of Classification Search
CPC ....... H02J 3/46; H02J 3/40; H02P 5/74; H02P 9/02; H02P 25/22
USPC .......................................................... 307/84
See application file for complete search history.

(56) References Cited

U.S. PATENT DOCUMENTS

| | | | | |
|---|---|---|---|---|
| 8,519,565 | B2 * | 8/2013 | Dozier ...................... | H02J 3/46 307/44 |
| 9,266,525 | B2 * | 2/2016 | Sato ........................ | B60K 6/445 |
| 2007/0284948 | A1 * | 12/2007 | Labitzke ............... | H02J 7/1423 307/84 |
| 2011/0121769 | A1 * | 5/2011 | Rozman .................... | H02J 3/38 318/400.27 |
| 2012/0049638 | A1 * | 3/2012 | Dorn ........................ | H02J 3/42 307/87 |
| 2012/0293004 | A1 * | 11/2012 | Hashimoto ............... | H02J 3/40 307/82 |
| 2012/0294049 | A1 * | 11/2012 | Hashimoto ............. | H02P 25/22 363/37 |

(Continued)

FOREIGN PATENT DOCUMENTS

JP    5839834 B2    1/2016

*Primary Examiner* — Alfonso Perez Borroto
*Assistant Examiner* — Esayas G Yeshaw
(74) *Attorney, Agent, or Firm* — Duft & Bornsen, PC (57) ABSTRACT

A power generator system, including a first generator and a second generator, a detector detecting a power of the first generator, a determinator determining whether a parallel operation of the first generator and the second generator is necessary based on a detection value detected by the detector when the first generator is operating and the second generator remains unstarted, a power supply unit supplying a starting power to the second generator to start the second generator when it is determined that the parallel operation is necessary, and a generator controller controlling operation of the second generator so as to operate synchronously in parallel with the first generator after the second generator is started.

4 Claims, 6 Drawing Sheets

(56) References Cited

U.S. PATENT DOCUMENTS

2016/0059710 A1\* 3/2016 Richey .................... B60L 11/08
 290/45
2019/0052084 A1\* 2/2019 Lee ....................... H02J 3/1842

\* cited by examiner

POWER GENERATOR SYSTEM

CROSS-REFERENCE TO RELATED APPLICATION

This application is based upon and claims the benefit of priority from Japanese Patent Application No. 2017-066549 filed on Mar. 30, 2017, the content of which is incorporated herein by reference.

BACKGROUND OF THE INVENTION

Field of the Invention

This invention relates to a power generator system including a plurality of inverter generators which are capable of implementing parallel operation.

Description of the Related Art

Equipment adapted to synchronously operate multiple inverter generators connected in parallel is known. In an arrangement taught by JP5839834B, for example, two inverter generators driven by engines are connected together through power lines and signal lines, and operation of the inverter generators is controlled to synchronize AC currents and voltages output from inverters of the pair of generators.

However, since the equipment set out in JP5839834B is configured to always operate the multiple generators in parallel, it adversely affects fuel efficiency and noise avoidance when, for example, parallel operation is continued under small load coverable by the output of a single generator.

SUMMARY OF THE INVENTION

An aspect of the present invention is a power generator system, including: a first generator and a second generator mutually connected in parallel, the first generator and the second generator including engines and inverter circuits and being driven by the engines, respectively. The power generator system including: a detector configured to detect any of an power, a remaining fuel and a noise of the first generator, or to detect a physical quantity correlated any of the power, the remaining fuel and the noise of the first generator; a determinator configured to determine whether a parallel operation of the first generator and the second generator is necessary based on a detection value detected by the detector when the first generator is operating and the second generator remains unstarted; a power supply unit configured to supply a starting power to the second generator to start the second generator when it is determined by the determinator that the parallel operation is necessary; and a generator controller configured to control the second generator so as to operate synchronously in parallel with the first generator after the second generator is started.

BRIEF DESCRIPTION OF THE DRAWINGS

The objects, features, and advantages of the present invention will become clearer from the following description of embodiments in relation to the attached drawings, in which.

DETAILED DESCRIPTION OF THE INVENTION

Figure 1:
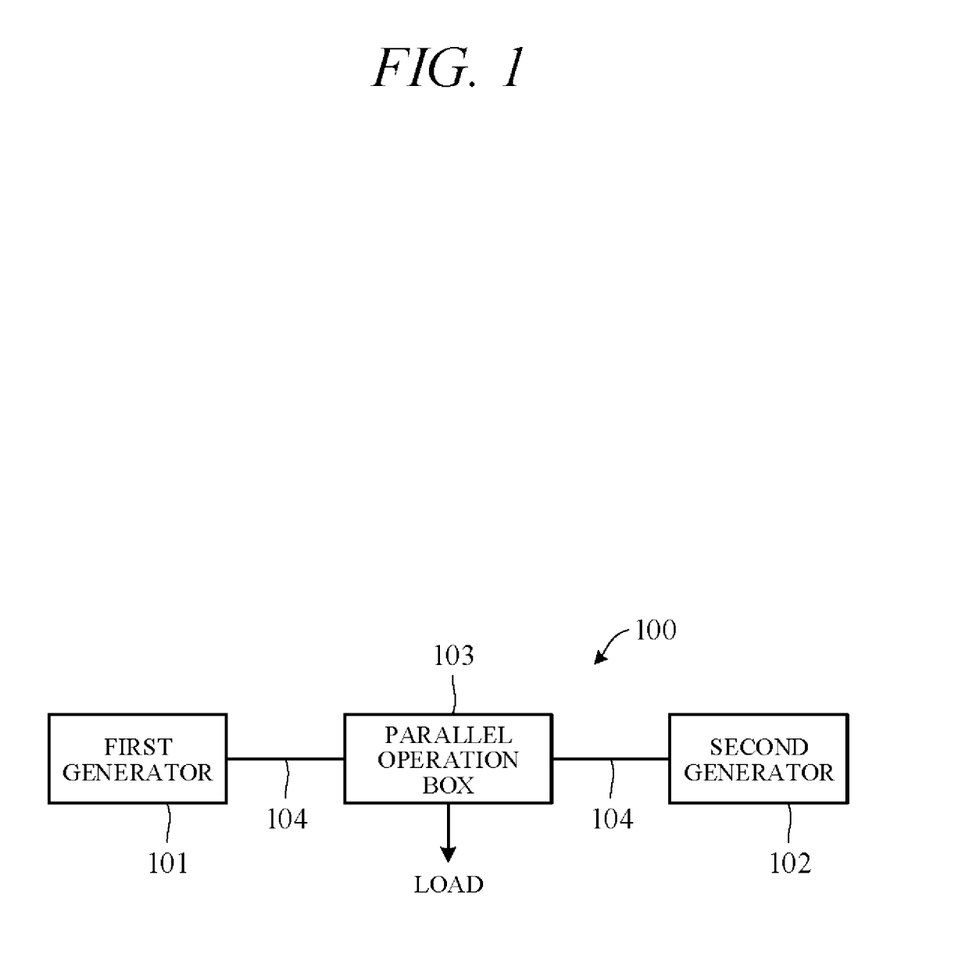
FIG. 1 is a diagram schematically illustrating an overall configuration of a power generator system according to an embodiment of the present invention.

An embodiment of the present invention is explained with reference to FIGS. 1 to 7 in the following. FIG. 1 is a diagram schematically illustrating the overall configuration of an electric power generator system 100 according to an embodiment of the present invention. This power generation system includes a first generator 101, a second generator 102, and a parallel operation box 103 that connects the first generator 101 and second generator 102 to enable parallel operation. The first generator 101 and second generator 102 are portable or mobile generators of weight and size a user can carry by hand. The first generator 101 and second generator 102 are, for example, identical specification alternating current power generators (AC generators) having a rated voltage of 120V and identical structures. The power generator system 100 is not limited two interconnected generators but can instead include three or more interconnected generators.

The generators 101 and 102 are connected to the parallel operation box 103 through separate cables 104. The cables 104 include power lines for passing current output from the generators 101 and 102 and communication lines for enabling intercommunication between the generators 101 and 102. The parallel operation box 103 forms an electrical circuit for interconnecting the generators 101 and 102 connected thereto in parallel. A socket is provided in the parallel operation box 103 and a load is connected to the socket. During parallel operation, a double power (double current) that when the generator 101 or 102 is operated alone can be obtained.

Figure 2:
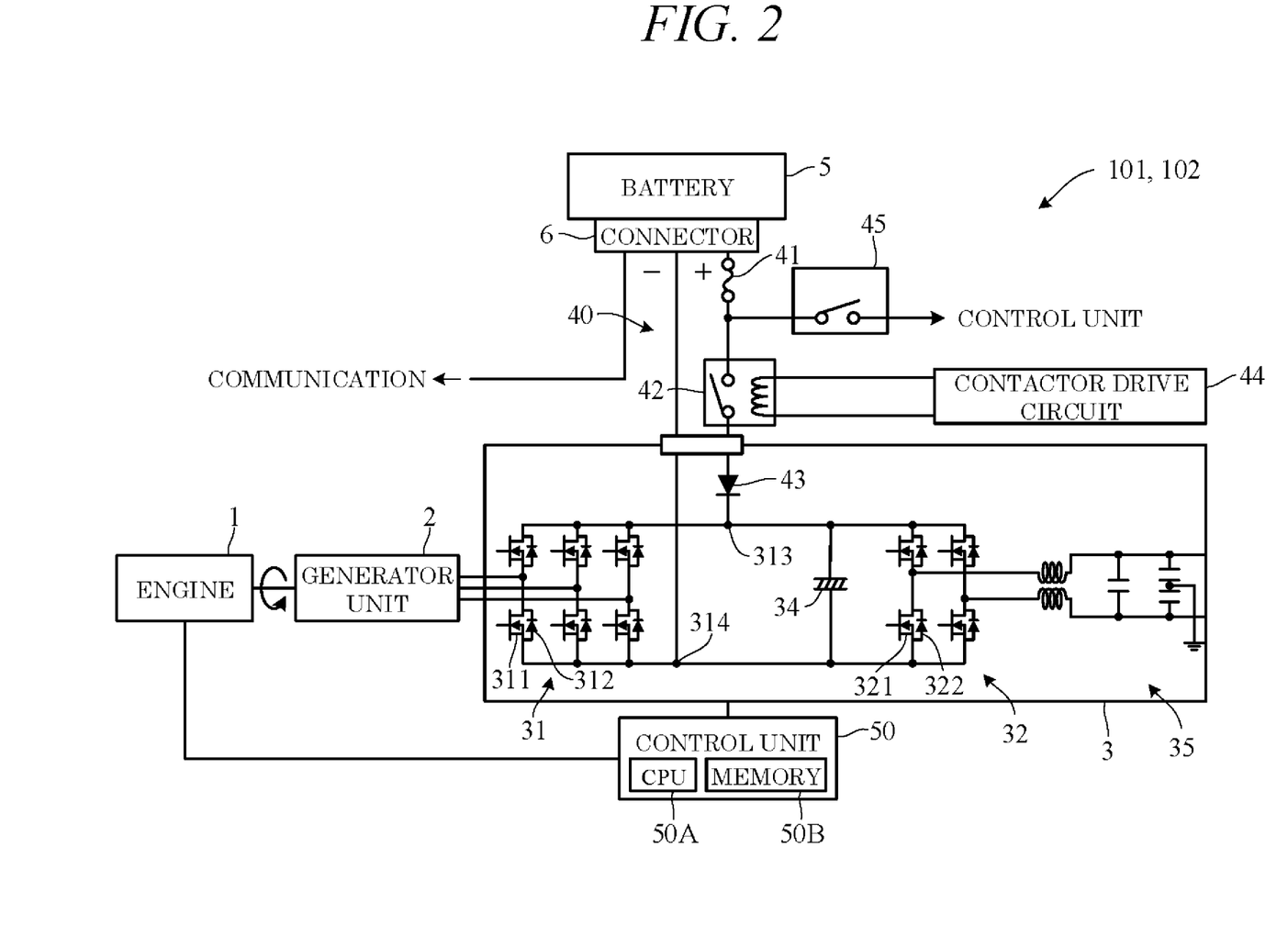
FIG. 2 is an electrical circuit diagram showing essential components of the power generator included in power generator system of FIG. 1.

FIG. 2 is an electrical circuit diagram showing essential components of the individual generators 101 and 102. As shown in FIG. 2, each of the generators 101 and 102 includes a general-purpose engine 1, a generator unit 2 driven by the engine 1, an inverter unit 3 electrically connected to the generator unit 2, and a control unit 50. The control unit 50 is a microcomputer configured to include an arithmetic processing unit including a CPU 50A, ROM, RAM and the like memory 50B, and additional peripheral circuits.

The engine 1 is, for example, a spark ignition, air cooled, gasoline fueled engine with a piston that reciprocates inside a cylinder and a crankshaft (output shaft) that rotates synchronously with the piston. Optionally, the engine 1 can be other than a gasoline engine. Motive power of the engine 1 is output through the crankshaft to the alternator 2. The engine 1 is driven under control of the control unit 50. Engine speed is variably controlled in response to load.

The alternator (generator main unit) 2 is a multipolar alternator driven by the engine 1 to generate AC power. It includes a rotor connected to and rotated integrally with the crankshaft and a stator arranged concentric with the rotor to face a peripheral surface thereof. The rotor is provided with permanent magnets. The stator is provided with UVW windings arranged at phase angle differences of 120 degree. The alternator 2 can be driven as a starter motor by power from a battery, in which case the engine 1 can be started. Although omitted in the drawings, a recoil starter is connected to the crankshaft of the general-purpose engine 1 and the engine 1 can be started by manually operating the recoil starter to rotate the crankshaft.

The inverter unit 3 includes a power conversion circuit 31 for rectifying three-phase AC current output by the alternator 2, and an inverter 32 for converting DC current output from the power conversion circuit 31 to predetermined AC current.

The power conversion circuit 31 is configured as an H-bridge circuit and includes three pairs of (a total of six) semiconductor switching elements 311 connected to respective U-phase, V-phase and W-phase windings of the alternator 2. The switching elements 311 are, for example, configured as MOSFET, IGBT or other transistors, and diodes (e.g., parasitic diodes) 312 are connected in parallel with the switching elements 311.

A gate of the switching element 311 is driven by a control signal output from the control unit 50, and ON-OFF switching of the switching elements 311 is controlled by the control unit 50. For example, when the generator unit 2 operates as a generator, the switching elements 311 are turned OFF, so that that three-phase AC is rectified by the diodes 312. The rectified current is smoothed by a capacitor 34 and sent to the inverter 32. When the generator unit 2 operates as a starter motor, the power converter circuit 31 ON-OFF controls the switching elements 311 to convert DC supplied from the battery 5 to three-phase AC for output to the generator unit 2.

The inverter 32 includes two pairs of (a total of four) semiconductor switching elements 321 configured as an H-bridge circuit. The switching elements 321 are semiconductor switching elements using MOSFET, IGBT or other transistors, and diodes (e.g., parasitic diodes) 322 are connected in parallel with the switching elements 321. A gate of the switching elements 321 is driven by control signals output by the control unit 50, ON-OFF switching of the switching elements 321 is controlled by the control unit 50 so as to convert DC current to single-phase AC current. The single-phase AC current generated by the inverter 32 is sinusoidally modulated through a filter circuit 35 including a reactor and a capacitor.

The battery 5 is electrically connected to the inverter unit 3 through a power supply circuit 40. The battery 5 may be configured as an internal battery which is included in the generators 101 and 102, or an external battery provided at the exterior of the generators 101 and 102. The power supply circuit 40 is provided such that the battery 5 is positioned between the power converter circuit 31 and the capacitor 34 through a connector 6, i.e., the battery 5 is positioned so as to connect to the positive side power terminal 313 and the minus side power terminal 314 of the power converter circuit 31. More specifically, a positive side terminal of the battery 5 is connected to the positive side power terminal 313 of the power converter circuit 31 through a fuse 41, a contactor 42 and a diode 43, and a negative side terminal thereof is connected to the minus side power terminal 314.

The contactor 42 includes a switch for electrically connecting (ON) and disconnecting (OFF) the battery 5 to and from the inverter unit 3, and its ON-OFF operation is controlled by a contactor drive circuit 44. A battery switch 45 is connected between the fuse 41 and the contactor 42, and power is supplied to the control unit 50 by turning the battery switch 45 ON. This causes the contactor drive circuit 44 to turn the contactor 42 ON. When the battery switch 45 is turned OFF, the contactor drive circuit 44 turns the contactor 42 OFF. In other words, the contactor 42 is turned ON and OFF conjointly with ON-OFF operation of the battery switch 45.

When the engine 1 is to be started by power from the battery 5, the user turns the battery switch 45 ON. This turns the contactor 42 ON, and power of the battery 5 is supplied to the power converter circuit 31. At this time, the control unit 50 determines whether the battery switch 45 is ON, and when the control unit 50 determines the battery switch 45 to be ON, it ON-OFF controls the switching elements 311 of the power converter circuit 31 to convert DC power to AC power. The resulting AC power is supplied to the generator unit 2, so that a revolving magnetic field is produced in a stator winding 24 (FIG. 3) and a rotor of the generator unit 2 rotates. As a result, a crankshaft 11 is rotated and the engine 1 can be started by cranking. The engine 1 of the generator can be started not only by turn-on operation of the battery switch 45 but also by a start instruction received from the other generator as explained later. A communication line is connected to the connector 6 and interior temperature, charge state and other battery 5 data are transmitted through this communication line to the control unit 50. Optionally, the engine 1 can be started using the battery and a starter motor, for example, rather than by using a three-phase bridge circuit having FETs or IGBTs as a motor driver. The circuit can therefore be configured as a three-phase hybrid bridge circuit using thyristors and diodes instead of as a three-phase bridge circuit with FETs or IGBTs.

A matter of interest here is that a configuration that constantly operates the pair of generators 101 and 102 in parallel is sometimes disadvantageous in terms of optimizing fuel efficiency and minimizing noise when, for example, parallel operation is continued under small load coverable by the power of a single generator. In the present embodiment, therefore, the power generator system 100 is configured as set out in the following so as to connect the first generator 101 and the second generator 102 in parallel and operate only one or the other of the generators alone in a small load situation and operate the first generator 101 and the second generator 102 in parallel when load becomes large.

Figure 3:
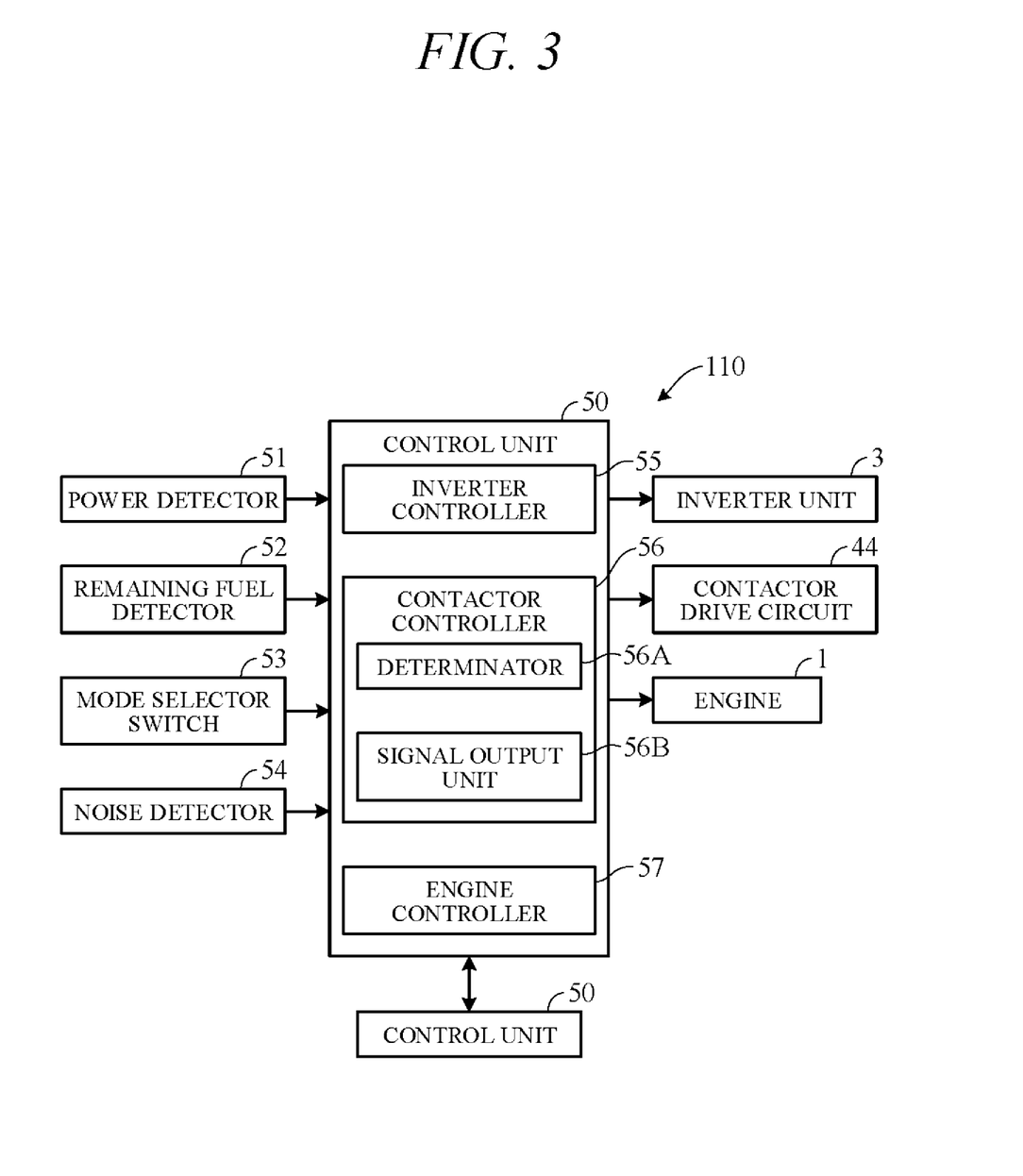
FIG. 3 is a block diagram showing essential components of the power generator included in power generator system of FIG. 1.

FIG. 3 is a block diagram showing essential components of the power generator system 100 according to an embodiment of the present invention, particularly a common configuration of control apparatuses 110 for controlling the generators 101 and 102. The control apparatuses 110 of the generators 101 and 102 are identically configured. FIG. 3 shows the configuration of only the control apparatuses 110 of the first generator 101 (subject generator), and illustration of the control apparatuses 110 of the second generator 102 (partner generator) is omitted.

As shown in FIG. 3, the control unit 50 receives signal inputs from a power detector 51, a remaining fuel detector 52, a mode selector switch 53, and a noise detector 54.

The power detector 51 is configured to include a current sensor for detecting AC current value and a voltage sensor for detecting voltage value output from the inverter unit 3, and the control unit 50 can detect power value (generated value) of the generators 101 and 102 by performing predetermined computations using the values detected by these sensors.

The remaining fuel detector 52 is a detector for detecting amount of fuel remaining in a gasoline tank, configured, for example, as a float-type detector that detects the height of a float floatingly provided in the gasoline tank.

The mode selector switch 53 is a switch operated by the user to instruct switching from normal operating mode to automatic parallel operating mode. Automatic parallel operating mode is a mode in which operation of the generators is automatically started when a predetermined auto-start condition is met, and an auto-start feature is enabled in this mode. In normal operating mode, the auto-start feature is disabled.

The noise detector 54 is a detector (noise sensor) for detecting value (level) of noise emitted from the generators.

The control unit 50 includes an inverter controller 55, a contactor controller 56 and an engine controller 57 as functional constitutions. Optionally, the controllers 55 to 57 can be provided as discrete controllers. The inverter controller 55 and the engine controller 57 constitute generator controllers that perform automatic control after the generators start.

The control unit 50 communicates through the signal line to exchange data with the control unit 50 of the other generator and outputs control signals to the inverter unit 3, contactor drive circuit 44 and engine 1. In the following, the one of parallel-connected first generator 101 and second generator 102 that starts first is called master generator and the one that starts later is called slave generator. If the slave generator remains unstarted after the master generator starts, the control unit 50 of slave generator is powered by electricity supplied through the power line from the master generator.

The inverter controller 55 of the master generator outputs control signals to and controls switching operation of the inverter unit 3 (inverter 32) so as to output AC from the inverter 32 of a voltage waveform exhibiting predetermined frequency and amplitude. The inverter controller 55 of the slave generator outputs control signals to and controls switching operation of the inverter unit 3 (inverter 32) based on power of the master generator detected by the power detector 51, thereby outputting AC of a voltage waveform synchronized with power of the master generator.

The contactor controller 56 includes a determinator 56A and a signal output unit 56B. When the master generator starts and the slave generator remains unstarted, the determinator 56A determines based on power detected by the power detector 51 whether a slave generator operation start condition is satisfied. Specifically, the determinator 56A determines that parallel operation is necessary when the power value is equal to or greater than a predetermined value P1. Predetermined value P1 corresponds to, for example, maximum power of the master generator or maximum power of the master generator multiplied by a predetermined coefficient less than 1 (such as 0.9, for example).

When the user turns the battery switch 45 ON, the signal output unit 56B outputs a control signal to the contactor drive circuit 44 to turn the contactor 42 ON. Even when the user does not turn on the battery switch 45, the signal output unit 56B of the master generator transmits a start instruction through the communication line to the slave generator when the determinator 56A of the master generator determines during automatic parallel operating mode that parallel operation is necessary. Upon receiving this start instruction, the signal output unit 56B of the slave generator outputs a control signal to the contactor drive circuit 44 to turn the contactor 42 ON. This starts the slave generator.

The engine controller 57 regulates speed of the engine 1 to desired engine speed by outputting control signals to a drive actuator of a throttle valve and/or a fuel injector provided in an air intake pipe of the engine 1. In addition, the engine controller 57 of the master generator acquires the power value detected by the power detector 51 of the slave generator through the communication line, calculates total power of the generators 101 and 102, and determines whether the total value is equal to or less than a predetermined value P2, i.e., whether an operation shutdown condition arose. Predetermined value P2 is, for example, set to a value smaller than predetermined value P1 and used to determine whether a slave generator operation start condition is met.

When total power value becomes equal to or less than predetermined value P2, the engine controller 57 of the master generator transmits an engine shutdown instruction to the slave generator through the communication line. Upon receiving the engine shutdown instruction, the engine controller 57 shuts down the engine 1 of the slave generator by stopping fuel supply from its fuel injector, i.e., operation of the slave generator is stopped. Alternatively, instead of the engine controller 57 of the master generator accessing the slave generator, the engine controller 57 of the slave generator acquires the power detected by the power detector 51 of the master generator through the communication line, calculates total power, and determines whether the total value is equal to or less than predetermined value P2.

Figure 4:
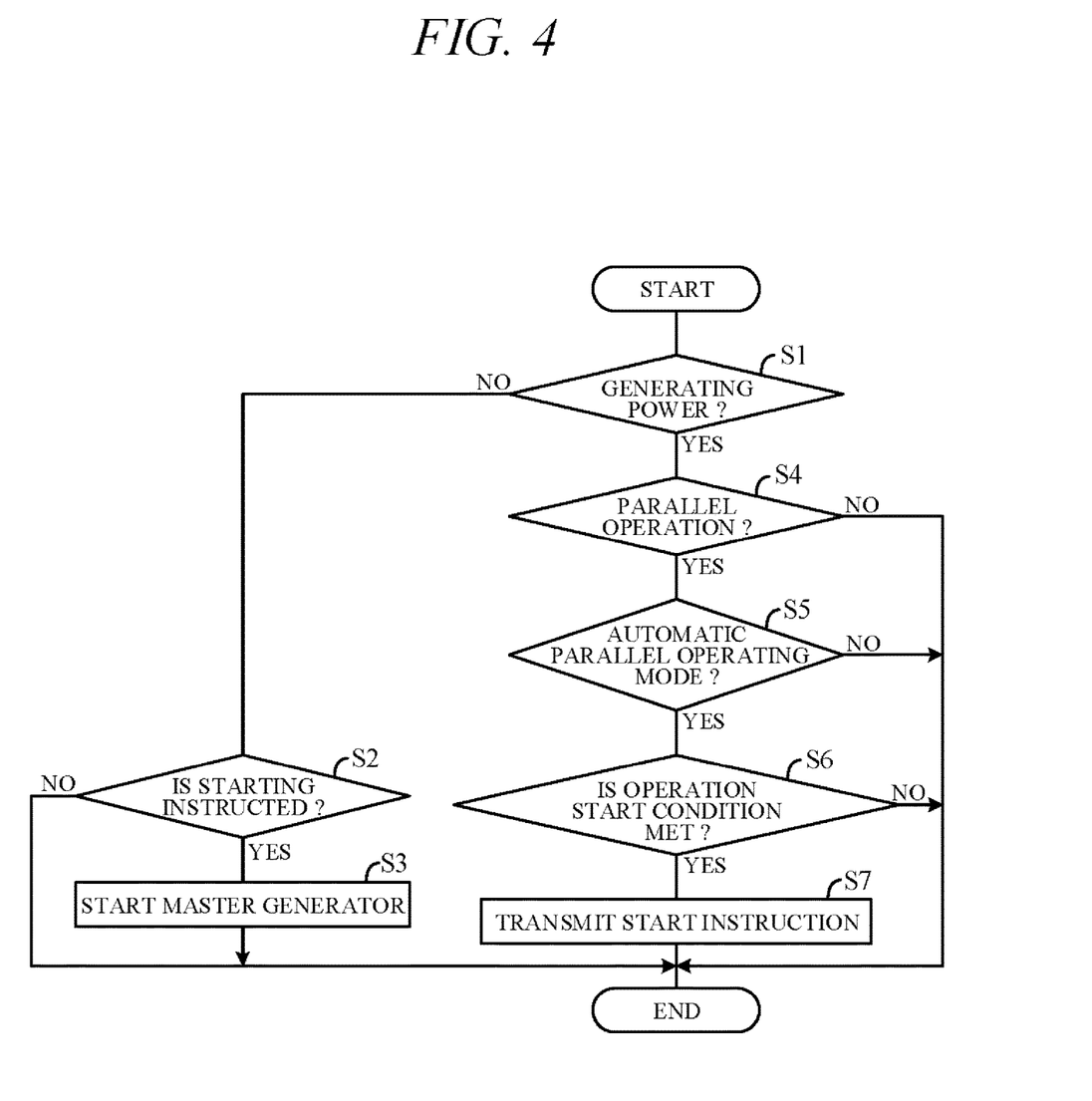
FIG. 4 is a flowchart showing an example of processing by the control unit of FIG. 3.

FIG. 4 is a flowchart showing processing by the control unit 50 (CPU 50A) of the master generator, particularly an example of processing related to starting the slave generator, performed in accordance with a program loaded in the memory 50B in advance. The processing shown in this flowchart is started when the master generator is powered ON and repeated at regular intervals.

First, in S1 (S: processing Step), whether the master generator is generating power is determined. When the result in S1 is NO, the program goes to S2 to determine whether starting is instructed, i.e., whether the battery switch 45 is turned ON. When the result in S2 is YES, the program goes to S3, and when NO, processing is terminated. In S3, a control signal is output to the contactor drive circuit 44 to start the master generator.

On the other hand, when the result in S1 is YES, the program goes to S4, in which whether parallel operation is in progress is determined by determining whether a power value detected by the power detector 51 of the slave generator is received through the communication line. When the result in S4 is YES, the program goes to S5, and when NO, processing is terminated. In S5, whether mode is switched to automatic parallel operating mode is determined by reading signal output of the mode selector switch 53. When the result in S5 is YES, the program goes to S6, and when NO, processing is terminated.

In S6, whether power value of the master generator detected by the power detector 51 is equal to or greater than predetermined value P1, i.e., whether the operation start condition of the slave generator is met, is determined. When the result in S6 is YES, the program goes to S7, and when NO, processing is terminated. In S7, a start instruction is transmitted through the communication line to the control unit 50 of the slave generator. This starts the slave generator and enables parallel generation.

Figure 5:
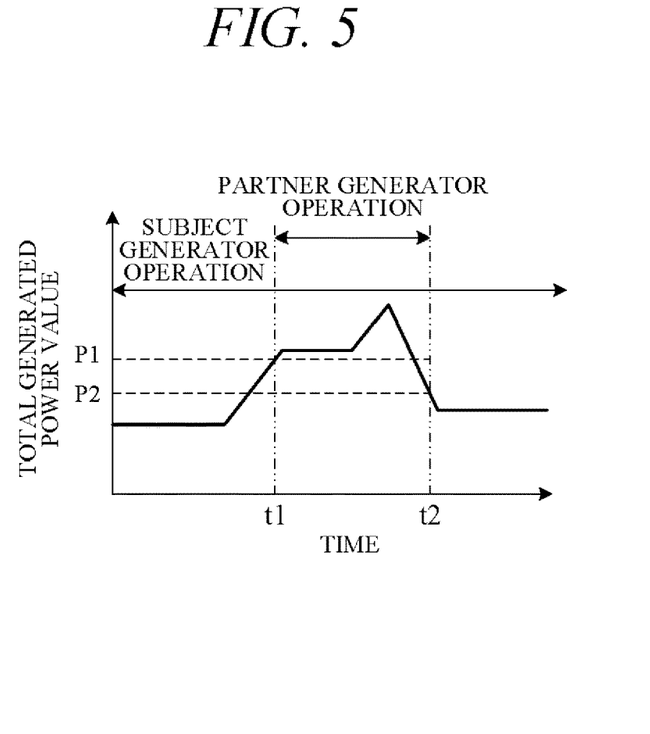
FIG. 5 is a time chart showing an example of operation of the power generator system according to the embodiment of the present invention.

FIG. 5 is a time chart showing an example of operation of the power generator system 100 according to an embodiment of the present invention, in which change of total power (total generated power value) of the master generator and slave generator is indicated. Initially, the master generator operates alone (operation by subject generator), and in this case power value of the master generator is total generated power value.

As shown in FIG. 5, total generated power increases to be equal to or greater than predetermined value P1 at time t1, whereupon the master generator transmits a start instruction to the slave generator (S7). As a result, the slave generator starts and the subject and partner generators operate concurrently, thereby commencing parallel operation. Adequate power can therefore be supplied to the load. When total generated power thereafter crosses to below predetermined value P2 (<P1) at time t2, the master generator transmits a shutdown instruction to the slave generator. As a result, the slave generator shuts down and the master generator again operates alone. Fuel consumption and noise can therefore be reduced relative to when the two generators 101 and 102 operate concurrently.

The present embodiment can achieve advantages and effects such as the following:

(1) The power generator system 100 includes the first generator 101 and the second generator 102, which are mutually connected in parallel, and have respective inverter units 3 (inverter circuits) (FIGS. 1 and 2). The first generator 101 and the second generator 102 includes engines and inverter circuits and are driven by the engines, respectively. Assuming a case where the first generator 101 is adopted as master generator and the second generator 102 as slave generator, this power generator system 100 includes the power detector 51 for detecting power of the first generator 101, the determinator 56A for, when the first generator 101 is operating and the second generator 102 remains unstarted, determining based on detection value detected by the power detector 51 whether parallel operation of the first generator 101 and the second generator 102 is necessary, the battery 5, signal output unit 56B and contactor drive circuit 44 for supplying starting power to the second generator 102 to start the second generator 102 when the determinator 56A determines parallel operation is necessary, and the inverter controller 55 and engine controller 57 for controlling operation of the second generator 102 after the second generator 102 starts so as to operate synchronously in parallel with the first generator 101 (FIGS. 2 and 3).

Owing to this configuration, the generators 101 and 102 need not always operate in parallel but is capable of starting parallel operation only when power deficiency is likely to arise with a single generator operating alone. As parallel operation starts in response to necessity in this manner, the generator system can achieve better overall fuel consumption and noise performance.

(2) When power detected by the power detector 51 reaches or exceeds predetermined value P2, the determinator 56A determines that the operation start condition is met, namely, that parallel operation is necessary, and therefore starts parallel operation at a suitable time for ensuring that no power deficiency arises with respect to the load.

(3) The engine controller 57 of the first generator 101 serves as a total power acquisition unit that uses signals from the power detectors 51 of the generators 101 and 102 to calculate total power of the generators 101 and 102 during parallel operation. In addition, the engine controller 57 of the first generator 101 serves as a generator controller outputs a shutdown signal to the engine controller 57 of the second generator 102 when calculated total power is equal to or less than predetermined value P2 smaller than predetermined value P1, whereby the engine controller 57 of the second generator 102 shuts down operation of the second generator 102. Terminating parallel operation in this manner when load is small further enhances fuel economy improving effect.

Figure 6:
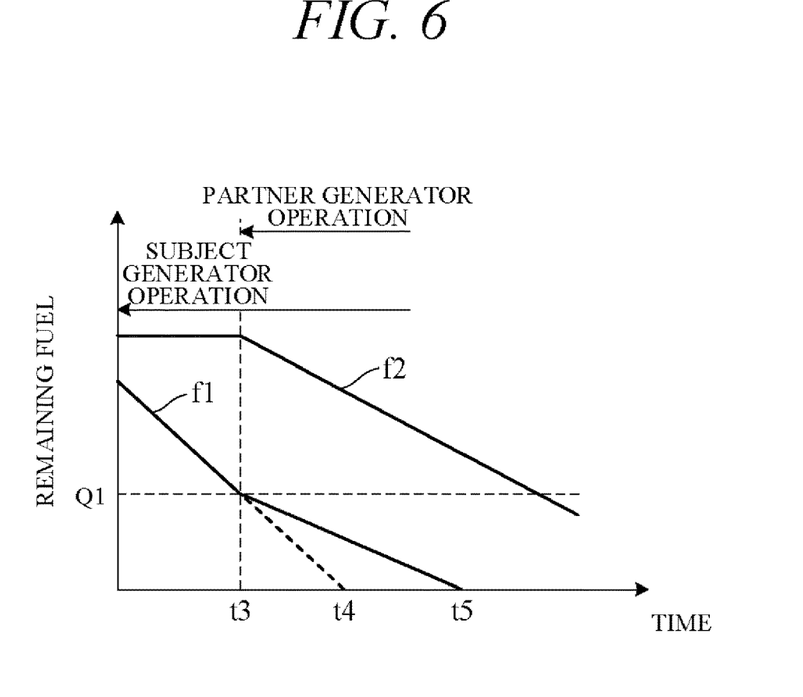
FIG. 6 is a time chart showing another example of operation of the power generator system according to the embodiment of the present invention.

In the aforesaid embodiment, whether operation of the slave generation is necessary is determined based on power of the master generator, i.e., on whether parallel operation start condition is met (S6), but the operation start condition is not limited to the aforesaid. Instead, for example, operation start condition can be determined to be satisfied in S6 and a start instruction transmitted to the slave generator when remaining fuel detected by the remaining fuel detector 52 of the master generator is a predetermined value or less. FIG. 6 is a time chart showing an example of operation in such a case. Curve f1 in FIG. 6 represents remaining fuel characteristic of the master generator, and curve f2 represents remaining fuel characteristic of the slave generator.

In the example of FIG. 6, initially only the master generator (e.g., first generator 101) operates, and remaining fuel of the master generator decreases over operating time (characteristic f1). When the determinator 56A determines at time t3 that remaining fuel has fallen to or below a predetermined amount Q1, the signal output unit 56B outputs a start instruction to the slave generator, whereupon the slave generator starts. As the generators 101 and 102 then go into parallel operation, power of the master generator declines by amount of power supplied by the slave generator. As rate of fuel consumption by the master generator therefore decreases as indicated by characteristic f1, operating time of the master generator can be extended from time t4 to time t5.

Figure 7:
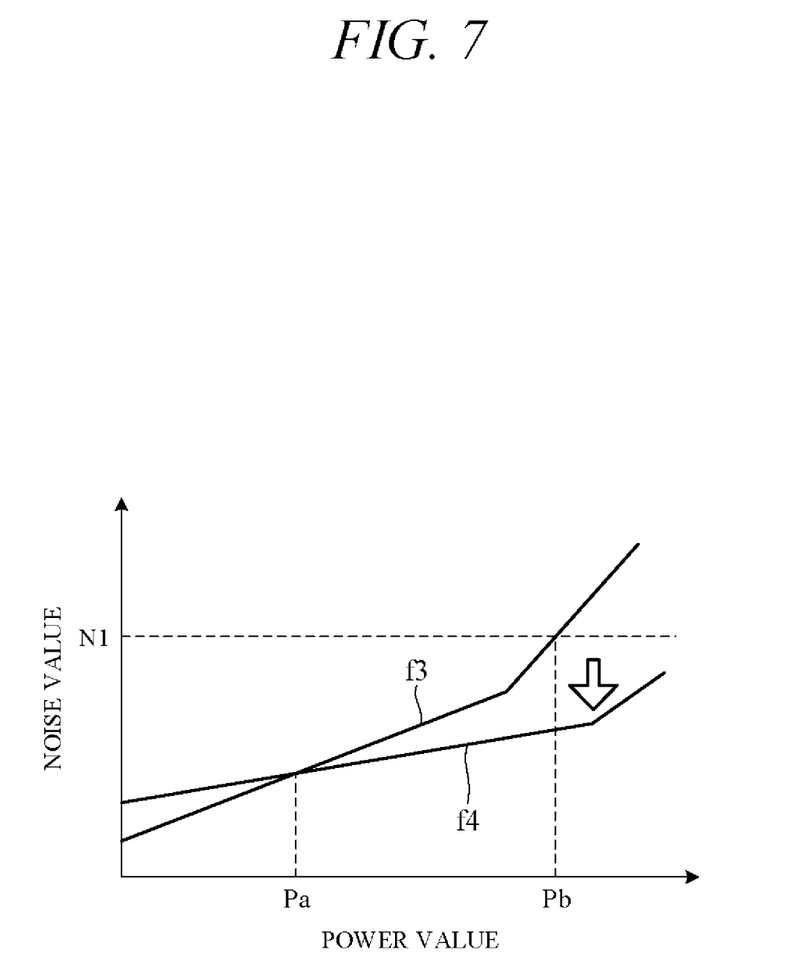
FIG. 7 is a diagram illustrating relation between power and noise value by the power generator system according to the embodiment of the present invention.

FIG. 7 is a diagram illustrating relation between power value and noise value. This relation during operation of solely the master generator is represented by characteristic f3 and that during operation of both the master generator and the slave generator in parallel by characteristic f4 in FIG. 7. As shown in FIG. 7, noise value is a function of power, namely, noise increases in proportion as power increases. This is because engine speed increases with increasing power (current) and noise value increases with increasing engine speed. Therefore, for a given power, noise value is generally smaller by parallel generator operation than by single generator operation since engine speed of the generators is lower during parallel operation.

In the particular case shown in FIG. 7, noise value during parallel generator operation is smaller than during single generator operation in a region of power above a predetermined value Pa. Optionally, with this in mind, parallel operation start condition can be determined to be satisfied and parallel operation implemented when noise must be held to not greater than a predetermined value N1, when power detected by the power detector 51 is equal to or greater than a predetermined value (e.g., Pb), when engine speed reaches a value equivalent to predetermined power value Pb, or when noise value detected by the noise detector 54 is equal to or greater than a predetermined value (e.g., N1). In other words, a configuration can be adopted whereby the noise detector 54 detects noise or a physical quantity correlated to noise of the master generator when the master generator operates alone, and the determinator 56A determines that parallel operation is necessary and parallel operation is implemented when the detected value reaches or exceeds a predetermined value. As a result, noise value can be held to not greater than predetermined value N1. Alternatively, noise can be detected (estimated) using the power detector 51 or an engine speed detector or the like in place of the noise detector 54.

In the aforesaid embodiment, power of the first generator 101 serving as master generator is detected by the power detector 51 and remaining fuel is detected by the remaining fuel detector 52, but the detector unit can be of any configuration insofar as it detects one of these or physical quantity correlated one of these. In the aforesaid embodiment, when the first generator 101 serving as master generator is operating and the second generator 102 serving as slave generator is unstarted, the determinator 56A determines whether parallel operation is necessary from, for example, whether value detected by the power detector 51 is equal to or greater than predetermined value P1, but the determinator is not limited to this configuration.

In the aforesaid embodiment, when the determinator 56A of the master generator determines that parallel operation is necessary the signal output unit 56B of the master generator transmits a start instruction to the signal output unit 56B of the slave generator, then the signal output unit 56B of the slave generator which receives the start instruction outputs a control signal to the contactor drive circuit 44 to supply power of the battery 5 to the generator unit 2 and start the slave generator. However, the power supply unit (e.g., power supply circuit 40) can be of any configuration insofar as it supplies starting power to the slave generator to start the slave generator when the determinator determines that parallel operation is necessary. For example, instead of supplying power from the battery 5 built into or attached to the slave generator as starting power, power supplied from the master generator to the slave generator through the power line can be used as starting power.

In the aforesaid embodiment, a configuration is adopted that operation of the slave generator is controlled by the inverter controller 55 so as to operate synchronously in parallel with the master generator after starting the slave generator, but the configuration of the generator controller with regard to starting synchronized operation is not limited to the aforesaid. In the aforesaid embodiment, a configuration is adopted whereby the engine controller 57 of the master generator acquires (calculates) total power value detected by the power detectors 51 of the generators and shuts down the slave generator when the total value falls to or below predetermined value P2, but the configuration of the engine controller with regard to shutting down parallel operation is not limited to the aforesaid. In the aforesaid embodiment, the first generator 101 and the second generator 102 are electrically connected through the parallel operation box 103, but a socket of capacity enabling parallel output can be installed in one of the generators and in such case the parallel operation box can be omitted.

The above embodiment can be combined as desired with one or more of the above modifications. The modifications can also be combined with one another.

In accordance with the present invention, when only one of parallel connected generators is operating, the other generator can be put in operation at an optimum time, thereby enabling the generator system to achieve enhanced fuel consumption and noise performance.

Above, while the present invention has been described with reference to the preferred embodiments thereof, it will be understood, by those skilled in the art, that various changes and modifications may be made thereto without departing from the scope of the appended claims.

What is claimed is:

1. A power generator system comprising a first generator and a second generator mutually connected in parallel, the first generator and the second generator including engines and inverter circuits and being driven by the engines, respectively, the power generator system comprising:
a detector configured to detect any of a power, a remaining fuel and a noise of the first generator, or to detect a physical quantity correlated any of the power, the remaining fuel and the noise of the first generator;
a determinator configured to determine whether a parallel operation of the first generator and the second generator is necessary based on a detection value detected by the detector when the first generator is operating and the second generator remains unstarted;
a power supply unit configured to supply a starting power to the second generator to start the second generator when it is determined by the determinator that the parallel operation is necessary;
a generator controller configured to control the second generator so as to operate synchronously in parallel with the first generator after the second generator is started; and
a total power acquisition unit configured to acquire a total power of the first generator and the second generator, wherein
the detector includes a power detector configured to detect a power of the first generator,
the determinator determines that the parallel operation is necessary when the power detected by the power detector reaches or exceeds a predetermined value, and
after the power detected by the power detector reaches or exceeds the predetermined value and the second generator is started, the generator controller stops an operation of the second generator when the total power acquired by the total power acquisition unit falls to or below a predetermined total value lower than the predetermined value.

2. A power generator system comprising a first generator and a second generator mutually connected in parallel, the first generator and the second generator including engines and inverter circuits and being driven by the engines, respectively, the power generator system comprising:
a detector configured to detect any of a power, a remaining fuel and a noise of the first generator, or to detect a physical quantity correlated any of the power, the remaining fuel and the noise of the first generator;
a determinator configured to determine whether a parallel operation of the first generator and the second generator is necessary based on a detection value detected by the detector when the first generator is operating and the second generator remains unstarted;
a power supply unit configured to supply a starting power to the second generator to start the second generator when it is determined by the determinator that the parallel operation is necessary; and
a generator controller configured to control the second generator so as to operate synchronously in parallel with the first generator after the second generator is started, wherein the detector includes a remaining fuel detector configured to detect a remaining fuel of the first generator, and the determinator determines that the parallel operation is necessary when the remaining fuel detected by the remaining fuel detector becomes equal to or less than a predetermined value.

3. A power generator system comprising a first generator and a second generator mutually connected in parallel, the first generator and the second generator including engines and inverter circuits and being driven by the engines, respectively, the power generator system comprising:
- a detector configured to detect any of a power, a remaining fuel and a noise of the first generator, or to detect a physical quantity correlated any of the power, the remaining fuel and the noise of the first generator;
- a determinator configured to determine whether a parallel operation of the first generator and the second generator is necessary based on a detection value detected by the detector when the first generator is operating and the second generator remains unstarted;
- a power supply unit configured to supply a starting power to the second generator to start the second generator when it is determined by the determinator that the parallel operation is necessary; and
- a generator controller configured to control the second generator so as to operate synchronously in parallel with the first generator after the second generator is started, wherein
  the detector includes a noise detector configured to detect the noise or the physical quantity correlated to the noise of the first generator, and
  the determinator determines that parallel operation is necessary when a detection value detected by the noise detector reaches or exceeds a predetermined value.

4. The power generator system according to claim 1, further comprising:
- a parallel operation box including an electrical circuit configured to interconnect the first generator and the second generator so that the parallel operation of the first generator and the second generator is implemented.

* * * * *